United States Patent [19]

Hulle et al.

[11] 3,918,307

[45] Nov. 11, 1975

[54] ENCODER FOR ALTIMETERS AND THE LIKE INSTRUMENTS

[75] Inventors: Robert M. Hulle, Calabasas; John Ferrero, Chatsworth; Gerard Pannullo, Canoga Park, all of Calif.

[73] Assignee: Trans-Can Industries, Inc., Van Nuys, Calif.

[22] Filed: Aug. 5, 1974

[21] Appl. No.: 494,778

[52] U.S. Cl. ................................................. 73/387
[51] Int. Cl.² ........................................ G01L 7/14
[58] Field of Search ..................... 73/384, 386, 387; 250/231 R, 231 SE

[56] References Cited
UNITED STATES PATENTS

| | | | |
|---|---|---|---|
| 3,513,708 | 5/1970 | Springer | 73/384 |
| 3,618,058 | 11/1971 | Springer | 73/384 |
| 3,750,473 | 8/1973 | Bennett et al. | 73/387 |

*Primary Examiner*—Donald O. Woodiel
*Attorney, Agent, or Firm*—Fred N. Schwend

[57] ABSTRACT

An inexpensive, compact and yet highly accurate instrument for transmitting coded signals representing altitudes at which an aircraft is flying, the instrument comprising an altitude sensing unit and a separate encoding unit operatively connected to the sensing unit with means for finely and precisely adjusting the encoding unit relative to the altitude sensing unit.

12 Claims, 6 Drawing Figures

ENCODER FOR ALTIMETERS AND THE LIKE INSTRUMENTS

BACKGROUND OF THE INVENTION

1. Field of the Invention

This invention relates to encoding devices and has particular reference to shaft encoders for sensitive instruments such as aircraft altimeters.

2. Description of the Prior Art

Altitude sensing and encoding instruments have been provided heretofore for reporting to ground stations as an integral part of the aircraft's altimeter used for flight reference. This has taken many forms such as a servo driven air data computer, self contained servo driven altimeter and an aneroid driven non servo driven altimeter. Such devices generally provide a visual display to the pilot of the altitude at which the aircraft is flying as well as providing an encoded signal equivalent to the visually displayed altitude for transmission to the ground.

Accordingly, these instruments must be highly accurate and are expensive as well as difficult to manufacture. This is largely due to the precision required in the gearing. By design the electrical signal must agree with the visual display within 125 ft. or less. This requires extreme accuracy to be designed into the gear train step up ratio between the encoding device and the visual display.

Additionally, by design, the existing instruments must at least be partially disassembled in order to adjust or install the encoding device. Also, the operating parts of the encoding devices of prior instruments have relatively high inertia and are frangible in nature, thus making the instrument highly susceptible to damage by vibration and shock usually found in aircraft. Further, inertial forces developed by such operating parts tend to react against the relatively weak actuating device to cause a lag in responding to changes in altitude.

STATEMENT OF THE INVENTION

According to the present invention, a compact, economically manufactured and highly reliable instrument, is provided for sensing and encoding the altitude at which the aircraft is flying independent of the pilot's visual display altimeter. This allows the two functions to be provided separately and independent of one another. Thus, the forces required to operate the encoding device are held to a minimum and the visual display can be provided by current state of the art techniques.

Because of the low inertia and shatterproof construction of its operating parts and its widely spaced shaft bearings, the instrument is superior in every respect in its ability to withstand vibration and shock as experienced in aircraft. In addition, because of the low mass of its operating parts the instrument is capable of rapidly responding to small changes in altitude. Further, the encoding device is incorporated in a self-contained rigid structure which can be economically manufactured in mass quantities and yet maintain a high degree of precision.

Adjustment means are provided to enable extremely fine and precise adjustment of the encoding module relative to the remainder of the instrument without having to disassemble the latter. Also the module can be easily removed or replaced without disturbing the calibration of the remaining parts of the instrument.

BRIEF DESCRIPTION OF THE DRAWINGS

The manner in which the above features and advantages of the invention are accomplished will be readily understood on reference to the following specification when read in conjunction with the accompanying drawings wherein.

DETAILED DESCRIPTION OF THE PREFERRED EMBODYMENT

Figure 4:
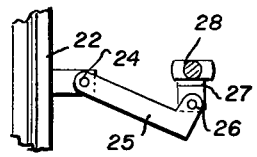
FIG. 4 is a sectional plan view taken along line 4—4 of FIG. 1.
Figure 2:
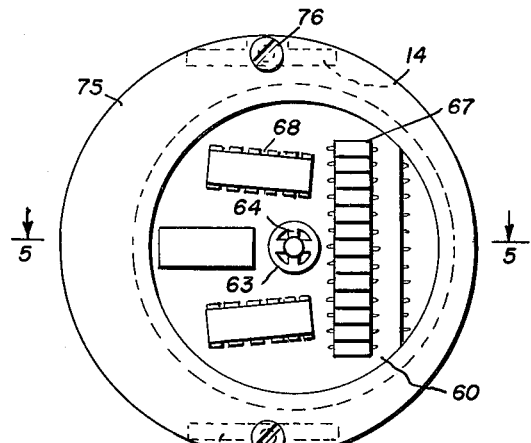
FIG. 2 is a top plan view of the instrument.

Referring to the drawings, the instrument comprises, in general, an altitude sensing unit 11 and an encoding unit 12 both supported by a frame including a base 13 adapted to be secured to the framework of an aircraft. Two spaced upstanding walls 14 and 14a (FIGS. 1 and 2) are rigidly secured to the base 13 and carry a top shelf 15 and integral frame parts 16 and 17. a vertical strut 18 is adjustably secured between the base 13 and frame part 17 by clamp screws 20 and supports a pair of aneroid bellows 21 and 22 which are connected together at 23 to operate in series. The right hand moveable end of bellows 22 is pivotally connected at 24 (see also FIG. 4) to a link 25 and the latter, in turn, is pivotally connected at 26 to an arm 27. Arm 27 is suitably mounted on a vertical spindle 28. The latter is provided with small diameter trunnion bearing elements 30 at opposite ends thereof which are journaled in jewel bearings 31 and 32 mounted in the frame part 16 and base 13, respectively.

A fine pitch anti-backlash spur gear 33 is fixed on the spindle 28 and extends into a cut-out portion 29 (see also FIG. 5) formed in a depending tubular extension 39 of a rigid cup-shaped support or housing 40. Gear 33 meshes with a pinion 34 hobbed in the lower end of vertically extending encoder shaft 35.

The shaft 35 has small diameter trunnion bearing elements 36 at opposite ends thereof which are journaled in jewel bearings 37 and 38. Bearing 37 is mounted in the lower end of the housing extension 39 and bearing 38 is mounted in a disc-like housing part 41 which fits snugly within a counterbored opening 42 in the housing 40 and is clamped therein by bolts 43.

Figure 6:
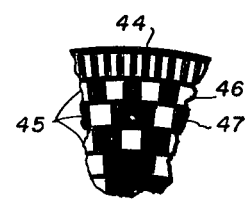
FIG. 6 is a fragmentary plan view of the encoding disc.

A transparent encoder disc 44, preferably of plastic, and having a series of concentric tracks 45 (FIG. 6) of alternately clear and opaque segments 46 and 47, respectively, is clamped against a shoulder 48 on shaft 35 by screws 50.

A plurality of light emitting diodes 51 are mounted below the encoder disc 44 in a segmental carrier 52 which extends into an opening 53 in the side of the housing 40 and is provided with tabs 49 (see also FIG. 3) secured to the wall of housing 40 by screws 150 to locate the diodes 51 in line with the respective ones of the encoding tracks 45.

A plurality of photo sensors 55, such as photo transistors, are mounted above the encoder disc 44 in a second segmental carrier 56 secured to carrier 52 by screws 57. A mask 58 having slits therein in line with respective diodes 51 is clamped between the two carriers 52 and 56 to restrict the beams of light projected by diodes 51 to narrow confines.

A circular printed circuit board 60 of plastic having printed circuits (not shown) on the bottom surface thereof is fitted within a second counterbored opening 61 in the housing 40 and is secured therein by a clamping washer 63 having spring fingers 64 which grip a central post 65 formed integrally with the part 41. A resilient 0-ring 66 is interposed between the washer and the board 60.

Electric components, such as resistors 67 and integrated circuit packages 68 are mounted on the upper surface of the board 60 and are electrically connected by conductors, i.e. 70, to the different diodes 51 and sensors 55 to generate coded digital signals representing the altitude, as measured by the aneroid bellows 21 and 22, and to transmit such signals to a suitable transponder (not shown).

Figure 5:
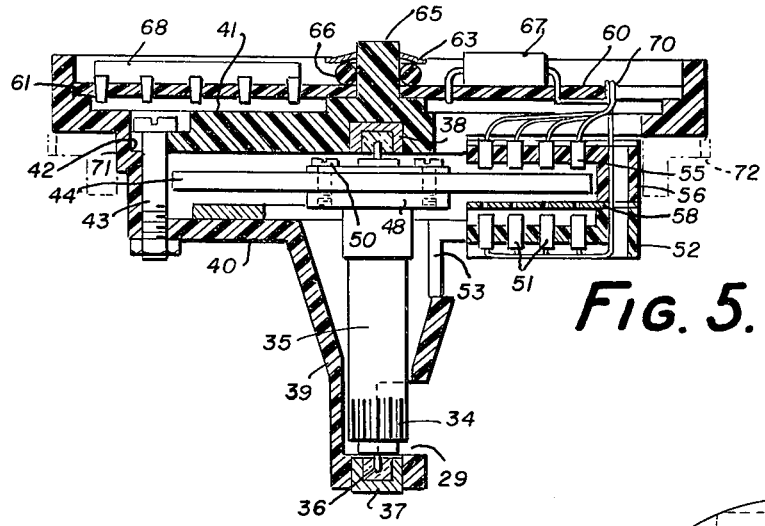
FIG. 5 is an enlarged sectional view through the encoding module and is taken substantially along the line 5—5 of FIG. 2.
Figure 1:
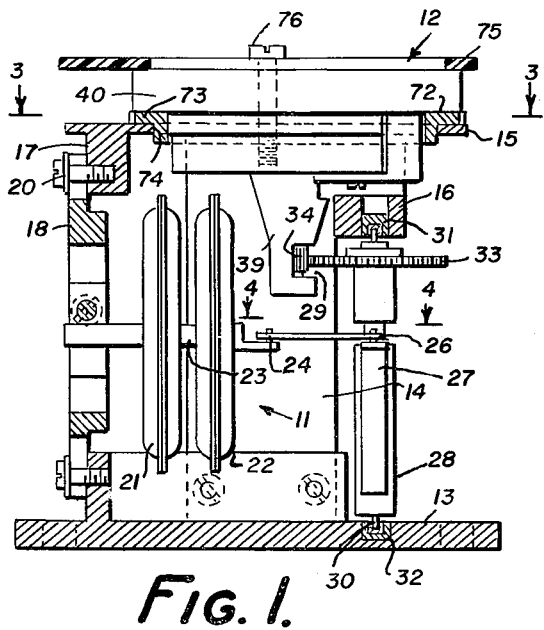
FIG. 1 is a longitudinal sectional view through an altitude sensing and encoding instrument embodying a preferred form of the present invention.
Figure 3:
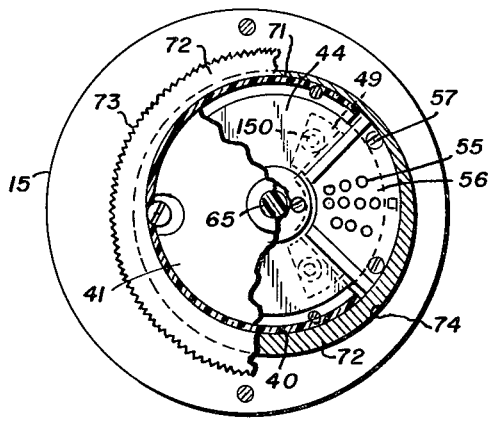
FIG. 3 is a sectional plan view taken along line 3—3 of FIG. 1.

According to one aspect of the present invention, the housing 40 has a depending circular bearing portion 71 which is concentric with the axis of shaft 35 and is rotatably fitted within an eccentric adjusting ring 72, (FIGS. 1, 3, and 5). The latter has a knurled flange 73 integral therewith and on which the housing 40 rests. The ring 72 is rotatably fitted within a circular bearing opening 74 formed in the frame shelf 15, thus providing for two forms of adjustment as will be described presently. The flange 73 rests on frame shelf 15.

After the pre-assembled encoder unit 12 has been fitted within the adjusting ring 72, the ring is rotated to carry the housing 40, and therefore pinion 34, in a partial orbit and in a parallel manner relative to the gear 33 until a proper meshing relation exists without backlash or binding tendencies. Because of the relatively large diameter of the adjusting ring 72 and the small amount of eccentricity thereof, very precise and fine adjustment of pinion 34 relative to gear 33 may be easily obtained. Another contributing factor to the achievement of fine adjustment of the pinion 34 is the fact that during adjustment of the ring 72 the pinion 34 sweeps in an orbit relative to the gear 33 instead of radially relative thereto.

After the above adjustment and in order to calibrate the instrument, the encoder housing 40 may be rotatably adjusted within tthe adjusting ring 72 until the signals generated by the tracks 45 of the encoder disc 44 represent the true altitude measured by the bellows 21 and 22.

Common means are provided to clamp both the housing 40 and the adjusting ring 72 in position after the above noted adjustment has been performed. For this purpose, an annular clamp ring 75 (FIGS. 1 and 2) rests on the upper surface of the housing 40 and is clamped thereagainst by two diametrically opposed clamp screws 76 and 77 which are threaded into the frame walls 14 and 14a.

It will be noted that the above noted adjustments may be easily and readily accomplished without having to disassemble any parts of the instrument. Also, the encoder unit 12 may be readily removed or replaced by merely removing the clamp screws 76 and 77 and ring 75, without disturbing the altitude sensing unit and its operating parts.

If desired, a visual display device, such as a dial indicator can be readily incorporated in the instrument and operatively connected to the shaft 28.

It should be further noted that the device results in a simple and compact instrument which nevertheless contains relatively long shafts with widely spaced bearings to prevent high leverage moment arms from developing due to vibration and/or accelerating forces which might otherwise cause wobble of the encoder disc and wear or possible damage to the bearings.

I claim:
1. Encoding means for altimeters or the like comprising
   a frame,
   a fluid pressure actuated device including a drive gear rotatably supported by said frame;
   an encoding device including an encoder disc and a pinion connected to said encoder disc;
   said pinion being engageable with said gear,
   a support for said encoding device,
   means on said frame forming a bearing,
   an adjusting member supported by said bearing for rotational adjustment about the axis of said bearing,
   said adjusting member supporting said support with the axis of said pinion eccentric to the axis of said bearing whereby said adjustment of said adjusting member will adjust said pinion relative to said gear, and
   means for sensing the position of said encoder disc relative to said support.
2. Encoding means as defined in claim 1 wherein said adjusting member comprises a ring surrounding said support.
3. Encoding device as defined in claim 1 wherein said encoding device comprises
   a shaft supporting said encoder disc and said pinion
   said support comprising
   a housing having counterbore concentric with the axis of said bearing, and
   a housing part removably fitted in said counterbore,
   said housing and said housing part rotatably supporting opposite ends of said shaft.
4. Encoding means for altimeters or the like comprising
   a frame,
   a fluid pressure actuated device including a drive gear rotatably supported by said frame;
   an encoding device including an encoder disc and a pinion connected to said encoder disc;
   said pinion being engageable with said gear,
   a support for rotatably supporting said pinion and said encoder disc,
   means on said frame forming a first bearing,
   an adjusting member supported by said first bearing for rotational adjustment about the axis of said first bearing,
   said adjusting member having a second bearing eccentric to said first bearing,
   said second bearing supporting said support for rotational adjustment about the axis of rotation of said pinion and said encoder disc whereby said adjustment of said adjusting member will adjust said pinion relative to said gear, and means on said support for sensing the position of said encoder disc.

5. Encoding means as defined in claim 4 comprising means for locking said support and said adjusting member in different adjusted positions.

6. An encoding means as defined in claim 4 comprising a single locking device for concurrently locking said support and said adjusting member in different adjusted positions.

7. Encoding means as defined in claim 4 wherein said adjusting member comprises a ring surrounding said support.

8. Encoding means as defined in claim 4 wherein said support comprises a housing substantially enclosing said encoder disc.

9. Encoding means as defined in claim 8 wherein said ring supports said housing.

10. Encoding means as defined in claim 8 wherein said frame supports said ring and said ring supports said housing.

11. Encoding means as defined in claim 4 wherein said encoding device comprises a shaft supporting said encoder disc and said pinion, a support comprising a housing having a counterbore concentric with said axis of said second bearing, and a housing part fitted in said counterbore, said housing and said housing part rotatably supporting opposite ends of said shaft.

12. Encoding means as defined in claim 11 wherein said housing has a second counterbore concentric with the axis of said second bearing, a printed circuit board fitted in said second counterbore, and means forming electrical connections between said circuit board and said sensing means.

* * * * *

UNITED STATES PATENT AND TRADEMARK OFFICE
CERTIFICATE OF CORRECTION

PATENT NO. : 3,918,307
DATED : November 11, 1975
INVENTOR(S) : Robert M. Hulle, John Ferrero and Gerald Pannullo It is certified that error appears in the above-identified patent and that said Letters Patent are hereby corrected as shown below:

In the first page, code [73] "Trans-Can" should read --Trans-Cal--.

Signed and Sealed this seventeenth Day of February 1976

[SEAL]

Attest:

RUTH C. MASON
Attesting Officer

C. MARSHALL DANN
Commissioner of Patents and Trademarks